Aug. 17, 1965  R. B. SCHAUS  3,201,083
SLURRY FLOWMETER
Filed June 19, 1963

INVENTOR.
ROBERT B. SCHAUS
BY
*Stuart W. Wohlgemuth*
ATTORNEY

United States Patent Office 3,201,083
Patented Aug. 17, 1965

3,201,083
SLURRY FLOWMETER
Robert B. Schaus, Northridge, Calif., assignor to North American Aviation, Inc.
Filed June 19, 1963, Ser. No. 289,129
6 Claims. (Cl. 253—148)

This invention relates to a device for measuring the flow of a fluid. More particularly this invention pertains to a flowmeter capable of measuring slurry compositions.

Prior to this invention there was no flowmeter employing a rotor which could be successfully used with slurrys, thixotropic materials and gels. All of the previous flowmeters of the type that employ a rotor in the stream of material were designed for utilization with relatively low viscosity liquids. These previous flowmeters may not be successfully used with the more viscous compositions or especially those having solid materials in the liquid. This is because the previous flowmeters would have a construction at rotor bearings or have other structural detail which is subject to becoming clogged.

One previous type of flowmeter incorporates the Bernoulli principle wherein the fluid flow creates upstream thrust components which exceeds downstream drag causing the rotor to float. However, this type of meter utilizes close-fitting shafts and bushing type bearings. The tolerances required permit particles in the fluid stream to lodge and be held up causing the rotor to slow down and finally stop. Another type of flowmeter utilizes as the rotor mount a shaft supported by ball bearings. This device fails when the raceways of the bearings fill with particles and eventually foul the ball bearing. This, of course, results in reduced rotor activity. Another type of meter employs a cantilever shaft mounted on three radial veins to support the rotor. Close-fitting bushing type bearings allow particles to pack and grow to a mass large enough to fill this area. This results in the turbine slowing down and finally stops the rotor activity. A type of flowmeter resembling the one to be described in this invention utilizes point contact at the bearings that support the rotor shaft. However, at the point of contact between the shaft and of the bearings the area provided is a flat surface which would serve to cause a buildup of the stream of material passing therethrough and eventually clog the point contact bearings preventing rotation of the rotor. As a result of the above disadvantages, the only practical way of determining flow prior to the invention involved the weighing of the ingredients in the stream.

The flowmeter of this invention employs conical-shaped support members for the rotor. These support members have a gradual taper to their bearings that are in contact with the rotor. The rotor likewise has conically-shaped support arms which also gradually taper to a point that is in contact with the bearings of the supports. Thus, the rotor is suspended between two support members in point contact therewith. At the two points of contact, the bearings of the support and the rotor leading to the points are both gradually tapered so that no material will clog at the point of contact. To better insure the operation of the device it has been found that it is preferable that the supports have a more gradual taper than the rotor. Thus, the preferred embodiment of the invention has a conical angle 60° at the point of the support member while the rotor has a conical angle of 30° leading to its point of contact with the support.

Thus, an object of this invention is to provide a flowmeter of such construction and design wherein the determination of the flow rate of liquid materials, especially those containing solids within the fluid stream can be readily measured and determined over extended periods of time. It is a further object of the invention to provide a novel flowmeter wherein the bearings supporting the rotor of the flowmeter are so designed that there is no area for clogging due to the presence of solid materials in a slurry passing through a meter.

These and other objects will become apparent from the following detailed description in which.

Figure 1:
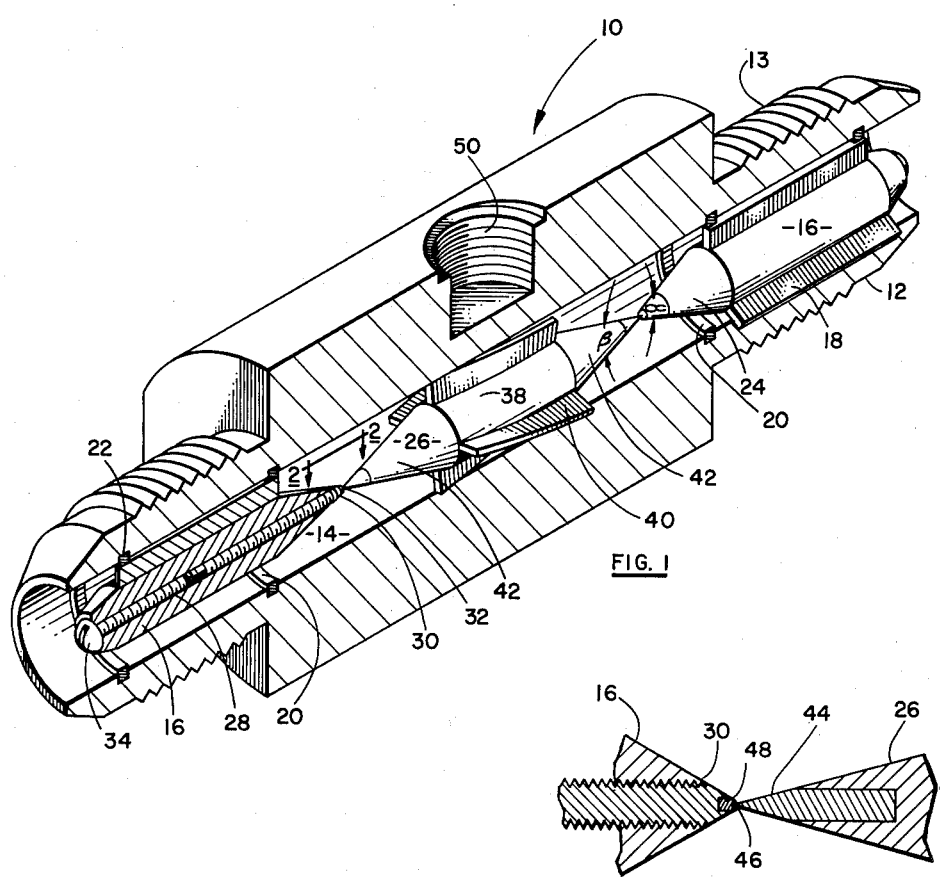
FIG. 1 is a pictorial representation of the meter of the invention.

With reference now to FIG. 1 there is shown a flowmeter having an elongated housing 10. The housing 10 has cylindrically-shaped ends 12 which are threaded 13 so that the device may be inserted into a line carrying a slurry composition in a chemical process or the like. The diameter of the inside 14 of the housing is equivalent to the inside diameter of the pipe line to which it is connected. Within the area 14, is situated the supports and rotor utilized for the flowmeter.

The two supports 16 for the rotor have elongated bodies which have radially extending fins 18 which serve to rigidly position the support member. This is accomplished by the engagement of the fins 18 by split rings 20 that are seated in the housing in apertures 22 provided. The split rings are forced apart for insertion of the support member 16. They then clamp upon the radial extending fins 18 to permanently seat the support structure within the housing.

One and 24 of the elongated cylindrically-shaped support member 16 is gradually tapered in a conical shape toward the rotor member 26. The threaded concentric aperture 28 extends the entire length of the support 16. At the tapered conical end 24 of the support, there is inserted a bearing 30 having a pointed end 32 which serves to engage the rotor. When the bearing 30 is inserted within the support, the frusto-conical end 24 of the support is completed to form an entire body having an angle $\alpha$ which is preferably not in excess of 60°. At the opposite end of the support structure 16 from the conical end a conventional set screw is threadably inserted. It extends within the threaded aperture 28 to meet the bearing. Thus, in order to adjust the bearing, the conventional set screw 34 is removed from the end of the support and the bearing is tightened against the rotor. This is accomplished by inserting a screwdriver and turning the bearing in the aperture. The screw 34 is subsequently replaced and tightened against the bearing preventing any material from reaching the bearing. This construction permits relatively easy adjustment of the bearing 30 without removing the entire support structure.

Disposed between the two bearings 30 on the supports 16 is the rotor 26. The rotor has a cylindrically-shaped central portion 38 which extends the length of the rotor. Rotor blades 40 and serves to support them. Rotor blades 40 are, of course, at a slight pitch so as to cause rotation of the rotor with the passing of the fluid and attachment of a slurry. The ends of the rotor 42 are gradually tapered away from the cylindrical center portion to a point which is in contact with the bearing. The configuration provides for conically-shaped ends having an angle of $\beta$ which is generally less than the angle $\alpha$ of the conical ends of the supports 16. This serves to insure movement of the slurry material away from the point of contact 32 between the jewel bearing and the end of the conical rotor. The angle $\beta$ is preferably 30° or considerably less than that of the angle $\alpha$. The angle $\alpha$, for example, may be 60°. As a result, it can be appreciated that the extent of conical slope of the rotor is much greater than that of the conical end of the support. In the operation of the device the incoming material is accelerated over the first bearing surface due to the difference in angles. This causes the material to be thrown to outer circumference of the housing where it contacts the rotor blades. Most of the material remains about the outer circumference of the housing as it passes over the second or downstream bearing point. This action prevents the deposit of material at either of the bearing points.

Figure 2:
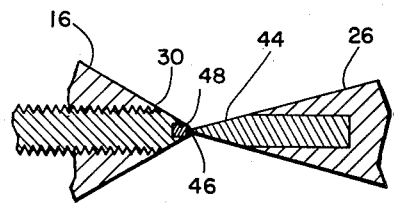
FIG. 2 is a sectional view of the rotor support mechanism.

FIG. 2 particularly discloses the relationship of the rotor and support showing the detail of the suspension area. Pressed-fit within the rotor is a needle-like or stylus structure 44 which comes to a point 46 at the end of the rotor 26. The needle or stylus 4 may preferably have a jewel tip such as diamond or may be an alloy of ruthinium or other metals. Threadedly inserted in the support 16 is the bearing 30. At the outermost tip of the bearing, there is press-fitted an insert 48, preferably a jewel such as diamond or sapphire which has a small V-groove at the very tip thereof. Seated within the V-groove of the jewel insert 48 is the point 46 of the rotor needle insert 44. This suspension provides for a non-clogging area at the point of suspension.

A threaded recessed area 50 is provided in the outer casing to accept available standard sensing coils of a detecting device not shown. These coils will sense the revolutions of the blades 40 on the rotor. The blades are normally of a magnetic material so that the revolutions can be readily picked up by the sensing coils which will reside in area 50. The detecting device may be one such as the magnetic pickup made by Electro Products Laboratories, Inc.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A slurry flowmeter comprising:
   a housing,
   a rotor disposed within said housing, magnetic blades disposed about said rotor, said rotor having a cylindrically-shaped central portion for supporting said rotor blades and conically-tapered ends, said ends tapering away from said central portion to a point,
   rotor supports disposed within said housing at each end of said rotor, said supports conically tapered to a point for point to point engagement with said conical ends of said rotor,
   whereby said rotor is in point contact with said supports.
2. The device of claim 1 wherein the conical angle of said supports exceeds the conical angle of said rotor ends.
3. A flowmeter device comprising:
   a housing having a cylindrical opening therein,
   a rotor disposed within said opening, magnetic blades disposed about said rotor, said rotor having a cylindrical central portion supporting said blades,
   said rotor additionally having conical ends, tapering away from said central portion to a point,
   stylii inserted in said conical ends of said rotor forming the end points thereon,
   rotor supports fixedly secured within said opening on each end of said rotor, said supports comprising cylindrically-shaped bodies having a conical end adjacent said rotor, said end tapering to a point,
   bearings inserted in said conical ends of said supports forming end points thereon,
   said stylii of said rotor engaging said bearings in said support whereby said rotor can freely rotate about its axis.
4. The device of claim 3 wherein said supports are provided with threaded longitudinal axial apertures therein extending the length of said supports,
   said bearings threadedly secured in said aperture at the conical end of said supports,
   and a set screw threadedly secured in said aperture at the opposite end of said support thereby closing said threaded aperture.
5. The device of claim 3 wherein the conical angle of said supports exceeds the conical angle of said rotor ends.
6. A flowmeter device comprising:
   a housing having a cylindrical opening therein,
   a rotor disposed within said opening, magnetic blades disposed about said rotor, said rotor having a cylindrical central portion supporting said blades,
   said rotor additionally having conical ends, tapering away from said central portion to a point,
   stylii inserted in said conical ends of said rotor forming the end points thereon,
   rotor supports disposed on each end of said rotor within said opening, said supports comprising cylindrically-shaped elongated bodies having a diameter less than the diameter of said opening in said housing and further having a conical end adjacent said rotor, said end tapering to a point,
   fins radially extending circumferentially from said supports,
   split rings seated in recesses provided in the circumference of said opening in said housing, said rings engaging said fins of said supports thereby positioning said supports within said opening,
   bearings inserted in said conical ends of said supports forming end points thereon,
   said stylii of said rotor engaging said bearings in said support whereby said rotor can freely rotate about its axis.

References Cited by the Examiner

UNITED STATES PATENTS

| 438,766 | 10/90 | Popp | 253—148 |
|---|---|---|---|
| 1,328,879 | 1/20 | Krueger | 73—229 |
| 2,346,864 | 4/44 | Packard | 73—229 |
| 3,053,087 | 9/62 | Waugh | 73—231 |

FOREIGN PATENTS

| 120,362 | 11/99 | Germany. |
|---|---|---|
| 752,496 | 6/56 | Great Britain. |

KARL J. ALBRECHT, *Primary Examiner.*
JOSEPH H. BRANSON, JR., *Examiner.*